(12) United States Patent
Bedi et al.

(10) Patent No.: US 6,718,854 B2
(45) Date of Patent: Apr. 13, 2004

(54) PC-CONTROLLABLE MATERIAL SHAPING MACHINE

(76) Inventors: Sanjeev Bedi, 319 Calvington Place, Waterloo, Ontario (CA), N2T 1P9; Ben Huynh, 42 Place Blvd., Hamilton, Ontario (CA), L8T 4Z8; Lee Chi Chau, 43 Heaslip Terrace, Toronto, Ontario (CA), M1T 1W8

( * ) Notice: Subject to any disclaimer, the term of this patent is extended or adjusted under 35 U.S.C. 154(b) by 0 days.

(21) Appl. No.: 09/928,952

(22) Filed: Aug. 14, 2001

(65) Prior Publication Data

US 2002/0040629 A1 Apr. 11, 2002

Related U.S. Application Data

(60) Provisional application No. 60/224,901, filed on Aug. 14, 2000.

(51) Int. Cl.[7] .............................. B23B 7/00; B23B 9/00
(52) U.S. Cl. .............................. 82/118; 82/133; 82/128
(58) Field of Search .......................... 82/118, 120, 121, 82/122, 123, 133, 11.2, 13, 128; 409/231, 232, 183, 185, 186, 199

(56) References Cited

U.S. PATENT DOCUMENTS

| | | | | |
|---|---|---|---|---|
| 3,633,011 A | * | 1/1972 | Bederman et al. .......... 700/192 |
| 4,509,126 A | * | 4/1985 | Olig et al. ................... 700/173 |
| 4,802,285 A | * | 2/1989 | Ligacz et al. ................ 33/551 |
| 5,406,494 A | * | 4/1995 | Schuett ....................... 700/188 |
| 5,493,502 A | * | 2/1996 | Niwa .......................... 700/188 |
| 5,703,782 A | * | 12/1997 | Dundorf ..................... 700/182 |
| 6,019,554 A | * | 2/2000 | Hong .......................... 409/132 |
| 6,073,058 A | * | 6/2000 | Cossen et al. .............. 700/184 |

* cited by examiner

Primary Examiner—Henry W. H. Tsai
(74) Attorney, Agent, or Firm—R. Craig Armstrong; Borden Ladner Cervais LLP

(57) ABSTRACT

A material shaping machine has a frame, a work-piece holder and a tool holder, for rotatably holding a tool. A computer performs real-time tool path calculations based upon stored mathematical representations of a desired work-piece surface and stored mathematical representations of an actual tool geometry, by calculating a desired position of a tool cutting edge relative a measured position of the tool cutting edge and a measured position of the work-piece, and adjusting a distance between the desired tool cutting edge and the measured position of the tool cutting edge in a first direction, so that the tool cutting edge reaches the desired position. Manipulation means provide a relative movement of the work-piece and the tool cutting surface in a second direction and a third direction. The manipulation means are operated outside the computer control. Sensors determine the position of the work-piece relative the cutting surface of the tool and send the position data to the computer.

15 Claims, 2 Drawing Sheets

PC-CONTROLLABLE MATERIAL SHAPING MACHINE

REFERENCE TO RELATED APPLICATIONS

This is a formal application, based on and claiming the benefit of provisional application No. 60/224,901, filed Aug. 14, 2000.

BACKGROUND OF THE INVENTION

1. Field of the Invention

This invention relates to numerically controlled mills or lathes, and more specifically to such mills or lathes being interfaced to and controlled by computers.

2. Description of the Prior Art

Numerically Controlled (NC) machines are available in the market in numerous forms, such as; milling machines, lathes, lathe-o-mills, swiss lathes etc. Most of these machines are designed for the production environment and are not available to the home user primarily because of the relatively high cost. The cost is attributed to the expensive components used to provide the two or more computer-controlled axes of motion. Each axis of a multi-axis computer controlled milling machine requires one motor, one motor controller, one signal feedback encoder and possibly one power supply. In order to produce an arbitrary 3-D shape, all three axes of movement are usually computer controlled.

Additionally, a special interface card together with the appropriate software controls these axes, together with the appropriate software running in the computer. In order to find a market for these machines with the average home user the cost must be brought down.

SUMMARY OF THE INVENTION

The PC-controllable material removal machine according to the present invention is similar in concept to a wood turning machine. One significant difference is that the cutting tool is milling (rotating) instead of being stationary. Further, of the generally used three axes of movement of the tool relative the work-piece to enable a three-dimensional shaping of the work-piece, only one axis is computer controlled (single axis material shaping machine). Movement of the workpiece relative the tool in the further two axes of movement is provided by manual or other means, and the correct tool path is calculated by the computer software by using prediction algorithms. Feedback of the position of the cutting tool relative the work-piece is by various sensors, for example linear or rotational and absolute or relative encoders.

In the invention, a material shaping machine has a frame, a work-piece holder and a tool holder for rotatably holding a tool. A computer performs real-time tool path claculations, based upon stored mathematical representations of a desired work-piece surface and stored mathematical representations of an actual tool geometry, by calculating a desired position of a tool cutting edge relative a measured position of the tool cutting edge and a measured position of the work-piece, and adjusting a distance between the desired tool cutting edge and the measured position of the tool cutting edge in a first direction, so that the tool cutting edge reaches the desired position.

The machine further advantageously has manipulation means for providing a relative movement of the work-piece and the tool cutting surface in a second direction and a third direction. The manipulation means are operated outside the computer control.

The machine preferably has sensors to determine the position of the work-piece relative the cutting surface of the tool and to send the position data to the computer.

The computer software preferably calculates a mathematical representation of the desired shape of the work-piece surface after machining, and uses the representation together with stored information regarding the shape of the tool and the cutting surface of the tool to control the relative distance between the tool cutting surface and the workpiece.

The representation is advantageously either an algebraic formula or a parametric formula.

In one embodiment of the machine, the tool holder is slidable relative the work-piece holder and the frame, to provide movement in the first direction.

The machine preferably has reciprocating means for selectively moving the tool holder in the first direction, the reciprocating means being controlled by software running on the computer; and where the reciprocating means is controlled by the computer software to move the tool holder corresponding to any detected movement of the workpiece by the manipulation means.

The work-piece is either rotatably held in the work-piece holder, to provide the second direction of movement of the work-piece, or is slidably held in the work-piece holder, to provide the second direction of movement of the work-piece. The first direction, the third direction and a rotation axis of the direction are generally perpendicular to each other. Alternatively, the first direction, the second direction and the third direction are generally perpendicular to each other.

In a further embodiment of the machine, the work-piece is slidably held in the work-piece holder to provide the first direction of movement of the work-piece.

The machine preferably has reciprocating means for selectively moving the work-piece holder in the first direction, the reciprocating means being controlled by software running on the computer; and where the reciprocating means is controlled by the computer software to move the work-piece holder corresponding to any detected movement of the workpiece by the manipulation means.

The work-piece is either rotatably held in the work-piece holder, to provide the second direction of movement of the work-piece, or is slidably held in the work-piece holder, to provide the second direction of movement of the work-piece.

The first direction, the third direction and a rotation axis of the second direction are generally perpendicular to each other. Alternatively, the first direction, the second direction and the third direction are generally perpendicular to other.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF THE PREFERRED EMBODIMENT

Figure 1:
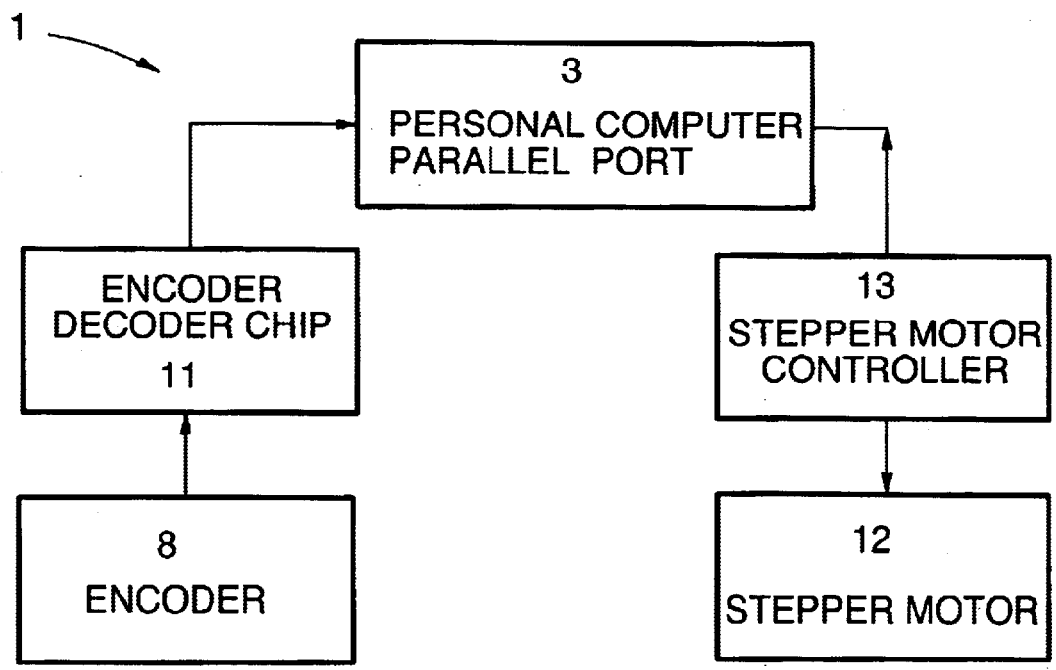
FIG. 1 is a diagram showing the material shaping machine and the controlling computer.
Figure 2:
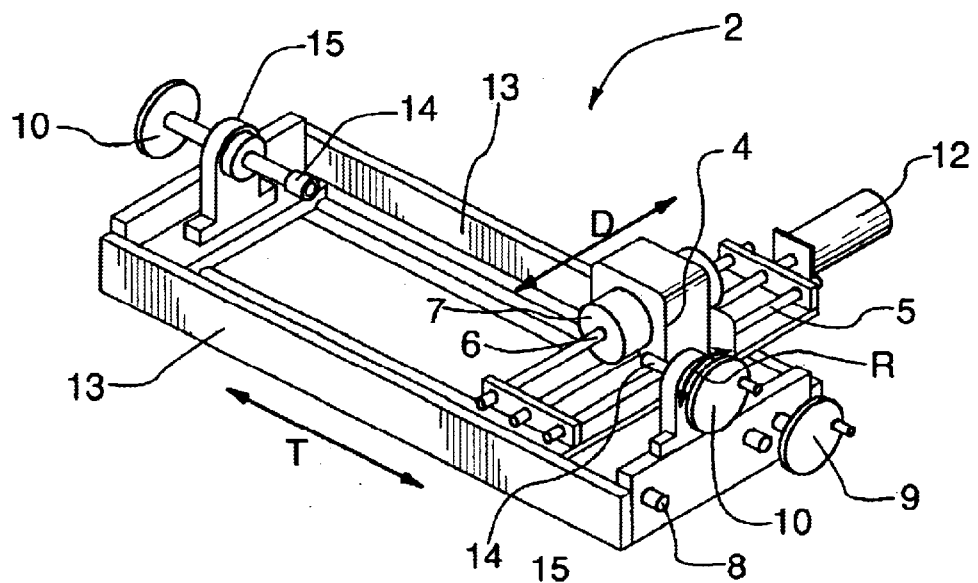
FIG. 2 is a schematic perspective view of one embodiment of a material shaping mahcine according to the invention.

A system 1 for a numerically controlled lathe is shown as a block diagram in FIG. 1 An embodiment of a material shaping machine 2, or lathe, as used in the system of FIG. 1 is shown in FIG. 2. Three axes of movement are shown: translational T, rotational R and depth D. A work-piece (not shown) can be rotated whilst a cutting tool on a carriage/sled is movable along the translational and depth axes. In the preferred embodiment, the depth axis is computer controlled, and the other axes are operated by any non-computer controlled means, for example by connecting the translational and depth axes carriages directly to screw mechanisms for motion operated by hand or constant-velocity electric motors, for example. The movement of the non-computer controlled axes can advantageously be coupled mechanically or electronically, so that movement in one axis simultaneously results in a corresponding movement of the other axis. The absolute movements of these axes can be correlated according to any desired pre-set value or, alternatively, be setup with a variable dependency, for example via a variable transmission.

A computer 3 houses and runs the user interface software and the machine control software. The user interface software allows the user to design and store two or three dimensional parts in the computer memory, for later machining in wood other materials. The user interface software also allows the user to select the tool geometry (shape of the tool and its cutting surface). The machine control software detects the motion of the various axes within the material shaping shaping machine 2 as the user operates them manually or with some other aid such as constant velocity electric motors, foot pedal mechanism etc. The non-computer controlled axes may also be mechanically coupled for simultaneous movement, possibly with different movement velocities. The detected motion is processed by the machine control software to determine the required motion of the one and only computer controlled axis. This motion is then imparted to the actuation means/reciprocating means 12 controlling the computer controlled axis through the parallel or other interface port of the computer under the control of the software. Any standard interface port is usable, for instance a serial, USB, infra-red, wireless or "fire-wire" interface port. Other machine functions, such as limit switches (not shown), homing (not shown), emergency switch (not shown) etc. are also preferably controlled through the parallel or other interface port. Limit switches would prevent damage to the material shaping machine by preventing over-travel of the carriages etc. Two limit switches are needed per axis. For maximum safety, limit switches should be hardwired in series with the motor driving the specific carriage. Emergency stop button(s) should be incorporated into the design to immediately isolate power from both the stepper motor as well as other motors of the system upon activation. Power to the computer should preferably be maintained. To calibrate the system, sensors are preferably added to each axis as required, to detect if the carriage is at its home position. For a system using relative encoders, it is especially important to calibrate the system to a known reference position each time the machine is used, to ensure positional accuracy. A known reference position also allows for a graceful recovery should the computer system crash or fail.

A main feature of the current invention is that only one axis of operation is under computer control and the remaining one or more axis of operation are operated manually or with a mechanism not under computer control (but which position is detected by the computer). The computer controlled axis is monitored and commanded by the computer itself, and the movement of the tool is regulated in response to the operation of the user-controlled axis. This mnovement is generated based on the design and shape of the work piece. This differs from previously known machines, in which the axes are designed to follow the path commanded of them; the machine controller does not do path generation.

The system according to the invention is designed for the home market and can have many different embodiments (for example a material shaping machine as shown in FIG. 2). In this embodiment, the machine 2 has a frame 13 on which a work-piece holder 14 is mounted in brackets 15. The computer controlled axis (D, depth axis) regulates the depth of a router 4 (tool holder) mounted on a slide 5. Operating the translational axis T manually (via a translation dial 9) or mechanically or electrically controls the location of the depth axis relative a tool 6 in a tool rotating means 7, for example an electric motor. A first encoder 8 (see FIG. 1), for example mounted at the end of the translation axis, is used to determine this location. The rotational axis R controls the orientation of the work piece (not shown). This can either be independently operated (via a rotational dial 10) or can be connected to the translation axis by a mechanism (not shown). A second encoder (not shown) is preferably attached to the rotational axis to determine the orientation of this axis. The encoders provide feedback as to the position of the cutting tool relative the work-piece. The encoders convert a rotational or linear motion into discrete electric signals, which can be processed to calculate the position of the encoder. The resolution of the encoder is measured in "counts per revolution (or linear length distance)" and is quantified by the number of pulses the encoder generates for each full rotation (or linear movement) of the encoder shaft. Via the computer parallel port (or any similar suitable standard interface, for example a serial port, a USB port, an infra-red port, a wireless interface port or a "fire-wire" interface port), the feedback from the encoders is correlated with a given (predetermined) wanted work-piece profile to calculate the required tool depth setting (relative the measured actual tool position relative the measured position of the work-piece surface). One advantage of using a standard interface such as the parallel port and not a specialized data acquisition card is that basically all personal computers have such ports as standard equipment, making this alternative much cheaper than using a special card. A parallel port, for example, is also simple to operate. Any computer having a suitable port would therefor be useful as a regulating computer according to the invention. For testing purposes, Hewlett Packard (TM) quadrature decoding chips were used to decode the quadrature optical encoder signals before processing by the computer.

The user operates the rotational and translation axis, R and T, respectively, either together or separately. The first encoder 8 detects the motion and using a decoding chip 11 passes the rotation information to the computer 3 through the parallel port. The computer uses the rotation information to determine the location of the depth axis D and work-piece orientation in real-time creation of the tool path (the tool location in relation to the work-piece). From the depth location and work-piece orientation and a preprogrammed or preselected work-piece description, the computer software determines the movement of the depth axis. This movement is imparted through stepper motor controller 13 to a stepper motor 12, which is also connected to the computer via the selected interface port. The stepper motor controller then moves the stepper motor on the slide 5 and the router 4 to the required depth location. Other suitable computer controlled actuators may be used instead of a stepper motor. For this application, the cheapest possible alternative is considered the best, as long as the functioning of the system is not compromised.

Limit switches (not shown) emergency switches (not shown) and calibration devices (not shown) may be integrated into the system 1, as necessary. The calibration devices would allow for a constant reference position and allow for re-initialization of the system in the event of a computer crash or failure.

The computer 3 runs the user interface program along with the machine control program. The user interface allows the user to define the part shape, either as a 2-dimensional curve or as a 3-dimensional curve, and the tool shape. Thereafter the system according to the invention moves the router in response to the user moving the translation and/or rotational axis.

Advantageously, the software can be expanded with a learning mode, in which the machine operator performs the machining operation manually (or assisted by the computer) and the resulting work-piece surface is stored in the computer for further work-piece machining operations providing the same shape.

Figure 3A:
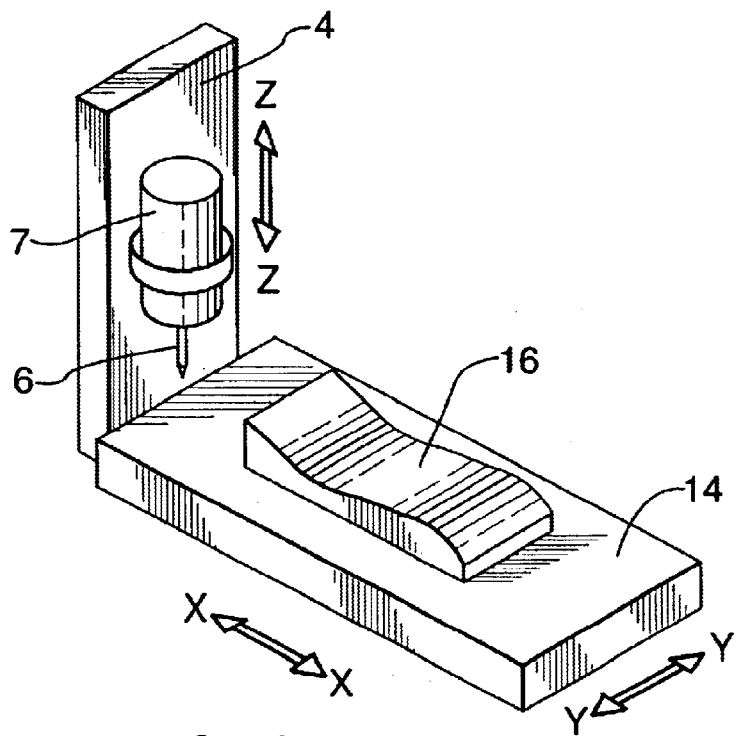
FIG. 3A is a schematic perspective view of a further embodiment of a material shaping machine according to the invention.

FIG. 3A shows a further embodiment of a material shaping machine according to the invention. Only the work-piece holder 14 with a work-piece 16 and the tool holder 4 with a tool 6 and a tool rotating means 7, are shown. Further features, for example the frame, are generally the same as shown for the previous embodiment (FIG. 2). The tool holder is movable in the first direction (marked as Z in the FIG.), which is under computer control. The further two directions of movement (second and third directions) are provided by the work-piece holder being movable in directions X and Y, respectively.

Figure 3B:
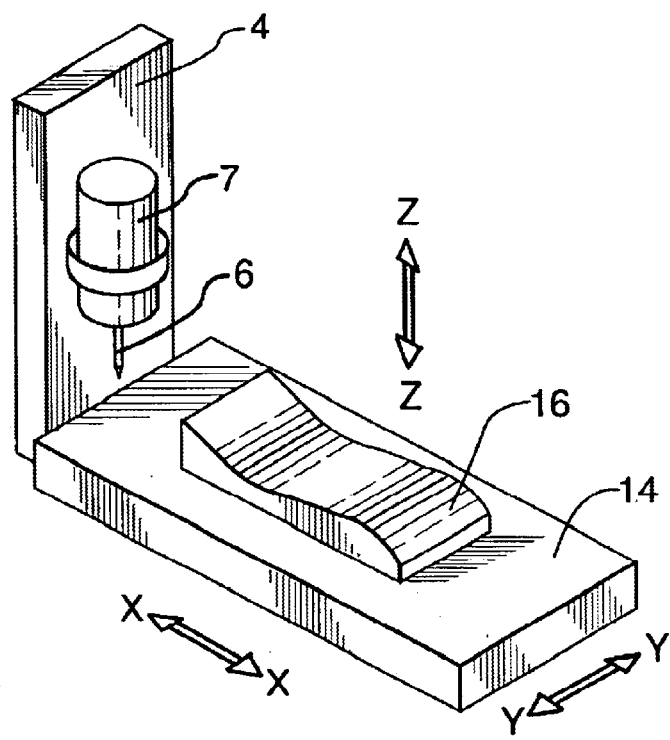
FIG. 3B is a schematic perspective view of still a further embodiment of a material shaping machine according to the invention.

FIG. 3B shows still a further embodiment of a material shaping machine according to the invention. This embodiment is similar to the embodiment shown in FIG. 3A, and the same reference numbers are used for the same features. The difference between this embodiment and the one shown in FIG. 3A is that the computer controlled direction of movement (first direction, Z) is provided by the work-piece holder being movable in this direction (and not the tool holder). The further two directions of movement (second and third directions) are provided by the work-piece holder being movable in directions X and Y, respectively.

It will be appreciated that the above description relates to the preferred embodiment by way of example only. Many variations on the invention will be obvious to those knowledgeable in the field, and such obvious variations are within the scope of the invention as described and claimed, whether or not expressly described.

What is claimed as the invention is:

1. A material shaping machine comprising:
 a frame supporting a workpiece holder and a tool holder, the workpiece holder and the tool holder being movable relative to each other in three axes, one of the three axes being a computer-controlled axis, and two of the three axes being manipulated through other than computer control;
 a cutting tool mounted in the tool holder, the cutting tool having a cutting edge for shaping a workpieee held in the workpiece holder;
 sensors for detecting, in real time, position information of the tool holder relative to the workpiece, and for providing the detected position information to a preprogrammed personal computer, the preprogrammed personal computer determining a desired position of the cutting edge along the computer-controlled axis, in accordance with the detected position information, a stored representation of a desired workpiece geometry and a stored representation of the tool geometry; and
 a controller for receiving the desired position of the cutting edge from the personal computer and using the received desired position to control relative movement between the tool cutting edge and the workpiece only along the computer-controlled axis such that the cutting edge reaches the desired position.

2. The material shaping machine of claim 1, wherein the stored representation of the desired workpiece geometry is stored as a mathematical representation.

3. The material shaping machine of claim 2, wherein the stored representation of the desired workpiece geometry is an algebraic formula.

4. The material shaping machine of claim 2, wherein the stored representation of the desired workpiece geometry is a parametric formula.

5. The material shaping machine of claim 1, wherein the controller controls reciprocating means for selectively moving the tool holder along the computer-controlled axis.

6. The material shaping machine of claim 1, wherein the workpiece holder is rotated about an axis perpendicular to the computer-controlled axis.

7. The material shaping machine of claim 5, wherein the tool holder is translated along an axis perpendicular to the computer-controlled axis.

8. The material shaping machine of claim 5, wherein the work-piece holder is translated along two perpendicular axes.

9. The material shaping machine of claim 5, wherein the reciprocating means includes a stepper motor.

10. The material shaping machine of claim 1, wherein the three axes are generally perpendicular to each other.

11. The material shaping machine of claim 1, wherein the preprogrammed personal computer is connected to the sensors and the controller via a standard computer interface port.

12. The material shaping machine of claim 1, wherein the sensors include encoders.

13. The material shaping machine of claim 12, wherein the detected position information includes encoded positions of the tool holder and the workpiece holder relative to the frame.

14. The material shaping machine of claim 13, wherein a position of the tool to the workpiece is calculated by triangulation.

15. A method of shaping a workpiece using a PC-controllable material shaping machine, the material shaping machine having a workpiece holder and a tool holder movable relative to each other in three axes, and a cutting tool mounted in the tool holder, the cutting tool having a cutting edge for shaping the workpiece held in the workpiece holder, the method comprising:
 (i) manipulating movement of the workpiece holder and the tool holder in two of the three axes through other than computer control;
 (ii) detecting, in real-time, a position of the tool holder along the two axes manipulated through other than computer control;
 (iii) transmitting the detected position to a preprogrammed personal computer;
 (iv) receiving from the preprogrammed personal computer a desired position of the cutting edge along a third axis of the three axes, the third axis being a computer-controlled axis, the desired position having been calculated according to the detected position, a stored representation of a desired workpiece geometry and a stored representation of the tool geometry; and (v) controlling movement of the tool holder along the computer-controlled axis until the cutting edge reaches the desired position.

* * * * *